(12) United States Patent
Larsson et al.

(10) Patent No.: US 10,682,709 B2
(45) Date of Patent: Jun. 16, 2020

(54) CUTTING TOOL AND ANVIL

(71) Applicant: SECO TOOLS AB, Fagersta (SE)

(72) Inventors: Andreas J. Larsson, Arboga (SE); Bjorn Gustafsson, Arboga (SE)

(73) Assignee: SECO TOOLS AB, Fagersta (SE)

( * ) Notice: Subject to any disclaimer, the term of this patent is extended or adjusted under 35 U.S.C. 154(b) by 0 days.

(21) Appl. No.: 16/302,960

(22) PCT Filed: Apr. 21, 2017

(86) PCT No.: PCT/EP2017/059464
§ 371 (c)(1),
(2) Date: Nov. 19, 2018

(87) PCT Pub. No.: WO2017/198417
PCT Pub. Date: Nov. 23, 2017

(65) Prior Publication Data
US 2019/0160548 A1 May 30, 2019

(30) Foreign Application Priority Data
May 20, 2016 (EP) .................................. 16170537

(51) Int. Cl.
*B23B 27/16* (2006.01)
*B23B 29/04* (2006.01)

(52) U.S. Cl.
CPC ...... *B23B 27/1662* (2013.01); *B23B 27/1677* (2013.01); *B23B 29/043* (2013.01); *B23B 2205/12* (2013.01); *B23B 2205/16* (2013.01); *B23B 2260/116* (2013.01); *B23B 2260/136* (2013.01); *B23B 2270/06* (2013.01)

(58) Field of Classification Search
CPC ............ B23B 2205/12; B23B 2205/16; B23B 2270/06; B23B 27/1662; B23B 27/1677; B23B 2260/136; B23B 2260/124; B23B 29/043
See application file for complete search history.

(56) References Cited

U.S. PATENT DOCUMENTS

| 4,080,854 A | * | 3/1978 | Peterson | .................. B23B 29/04 407/79 |
| 4,329,091 A | * | 5/1982 | Erkfritz | ................. B23C 5/2441 407/108 |
| 4,470,732 A | * | 9/1984 | Lindsay | .............. B23B 27/1662 407/104 |

(Continued)

FOREIGN PATENT DOCUMENTS

| EP | 1013365 A1 | 6/2000 |
| SU | 956163 A1 | 9/1982 |
| WO | 9801249 A1 | 1/1998 |

*Primary Examiner* — Sara Addisu
(74) *Attorney, Agent, or Firm* — Corinne R. Gorski

(57) ABSTRACT

A metal cutting tool includes a tool holder, a seat in the tool holder defined by side walls and a bottom surface. A replaceable element formed by an insert seating anvil is positioned in the seat and secured by a fastening device. A cutting insert is supported on a base surface of the anvil. The anvil has a projecting element formed integrally with the anvil. The projecting element is rigid and has a dove tail shape in top view, wherein the projecting element base and lower surfaces form coplanar extensions of the base and lower surfaces of the rest of the anvil.

13 Claims, 10 Drawing Sheets

(56) References Cited

U.S. PATENT DOCUMENTS

| | | | | |
|---|---|---|---|---|
| 4,667,713 | A * | 5/1987 | Wright | B23C 5/2265 |
| | | | | 144/231 |
| 4,759,244 | A * | 7/1988 | Engibarov | B23B 29/04 |
| | | | | 407/87 |
| 5,129,767 | A * | 7/1992 | Satran | B23C 5/2208 |
| | | | | 407/104 |
| 5,810,518 | A * | 9/1998 | Wiman | B23B 27/065 |
| | | | | 407/102 |
| 5,836,724 | A * | 11/1998 | Satran | B23B 27/1662 |
| | | | | 407/104 |
| 7,488,142 | B2 * | 2/2009 | Englund | B23B 27/1622 |
| | | | | 407/103 |
| 7,632,046 | B2 * | 12/2009 | Andersson | B23B 27/065 |
| | | | | 407/113 |
| 8,540,462 | B2 * | 9/2013 | Pantzar | B23C 5/2208 |
| | | | | 407/38 |
| 8,690,491 | B2 * | 4/2014 | Hosp | B23C 5/006 |
| | | | | 407/43 |
| 9,421,614 | B2 * | 8/2016 | Morgulis | B23B 27/065 |
| 2003/0143040 | A1 | 7/2003 | Jansson | |
| 2005/0152804 | A1 * | 7/2005 | Sjogren | B22F 5/003 |
| | | | | 419/1 |
| 2008/0152441 | A1 | 6/2008 | Andersson et al. | |
| 2010/0254774 | A1 * | 10/2010 | Hecht | B32B 27/007 |
| | | | | 407/101 |
| 2015/0158091 | A1 * | 6/2015 | Hecht | B23C 5/207 |
| | | | | 407/47 |
| 2015/0231705 | A1 * | 8/2015 | Sashin | B23B 27/1696 |
| | | | | 407/89 |

* cited by examiner

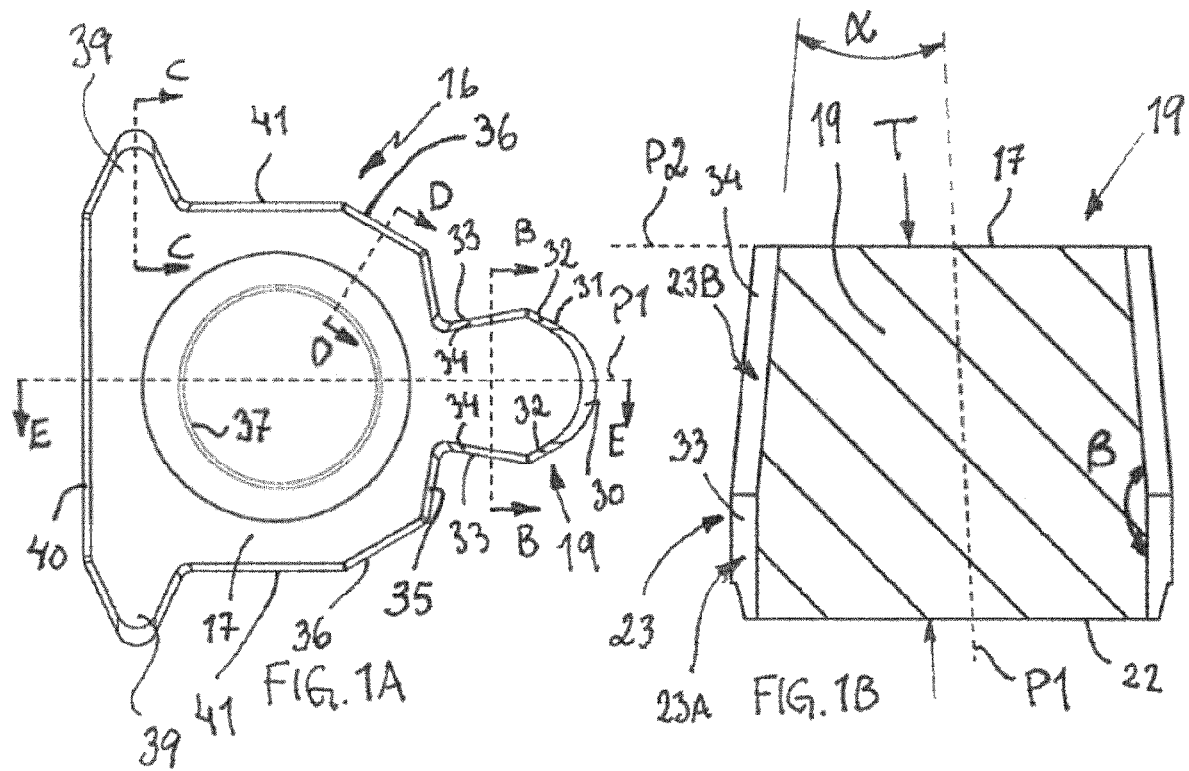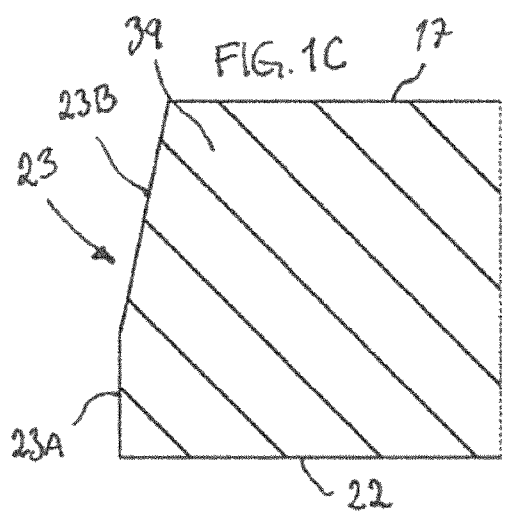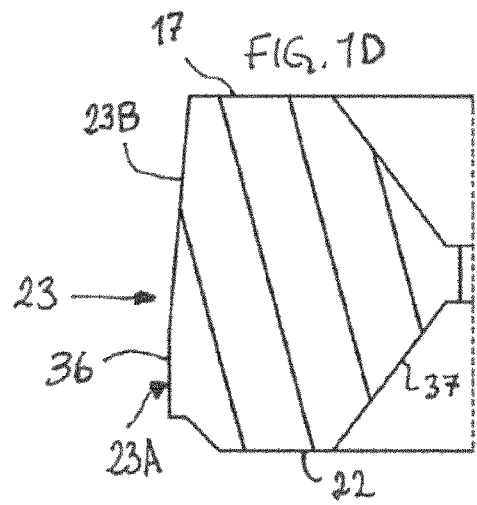

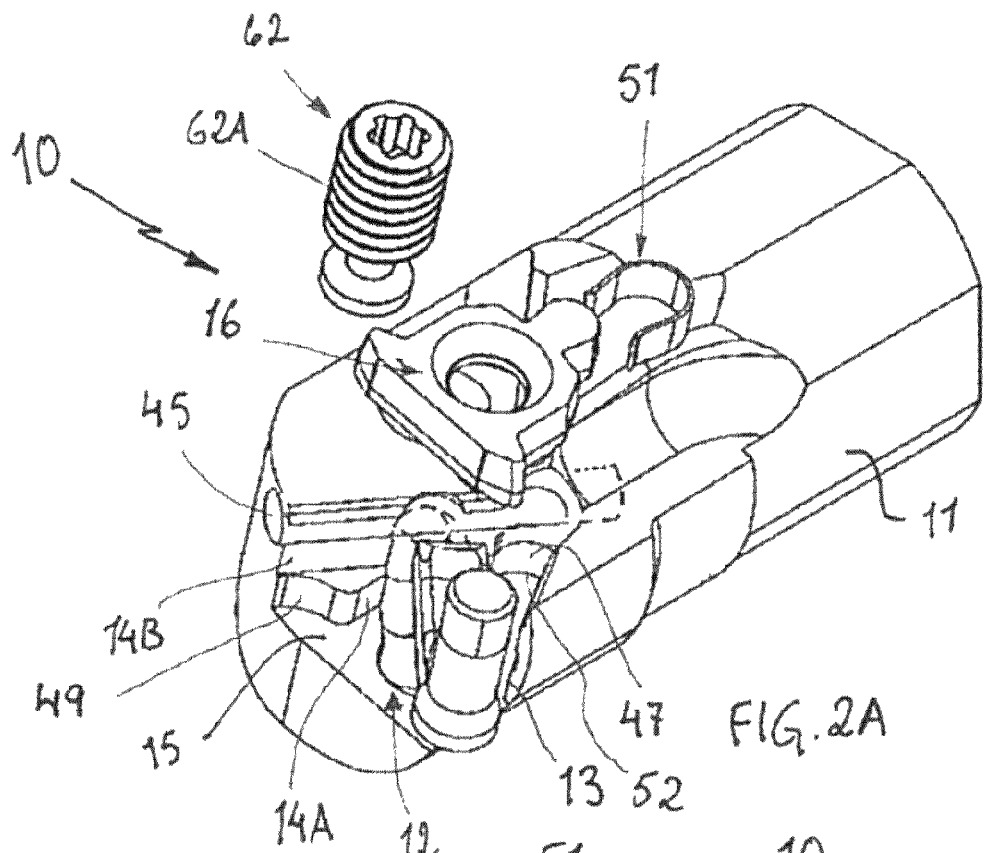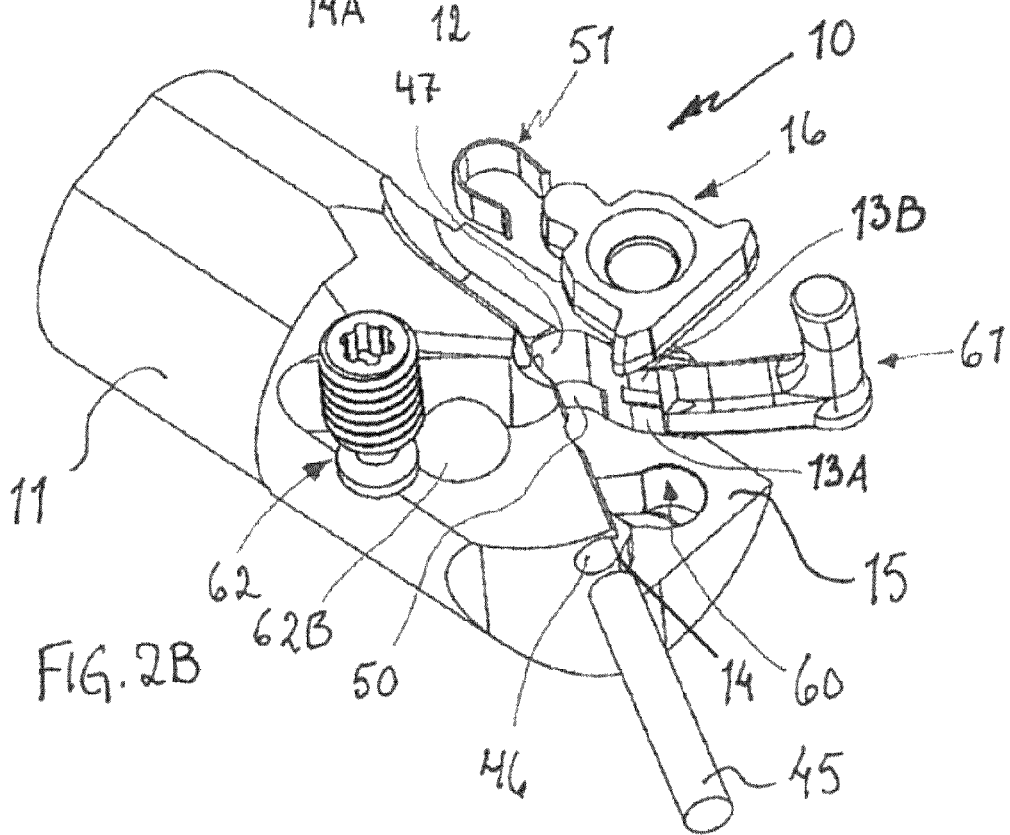

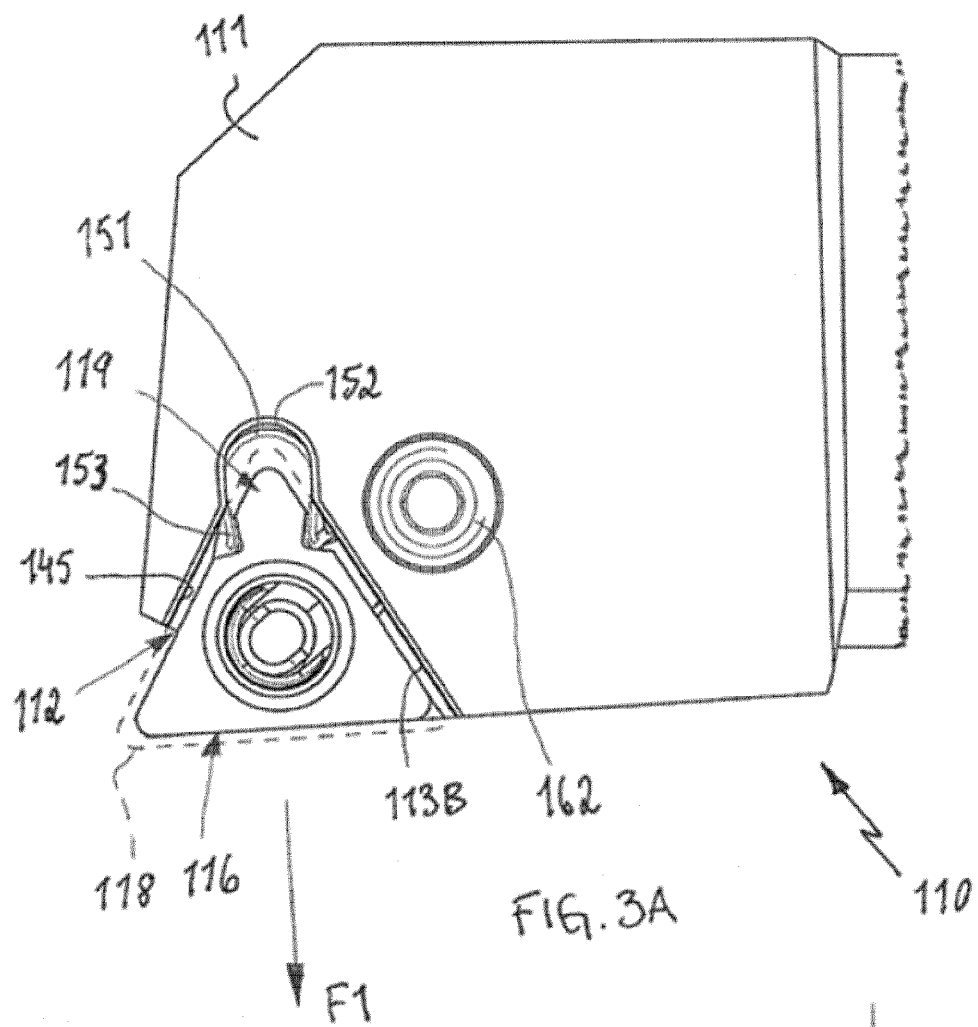
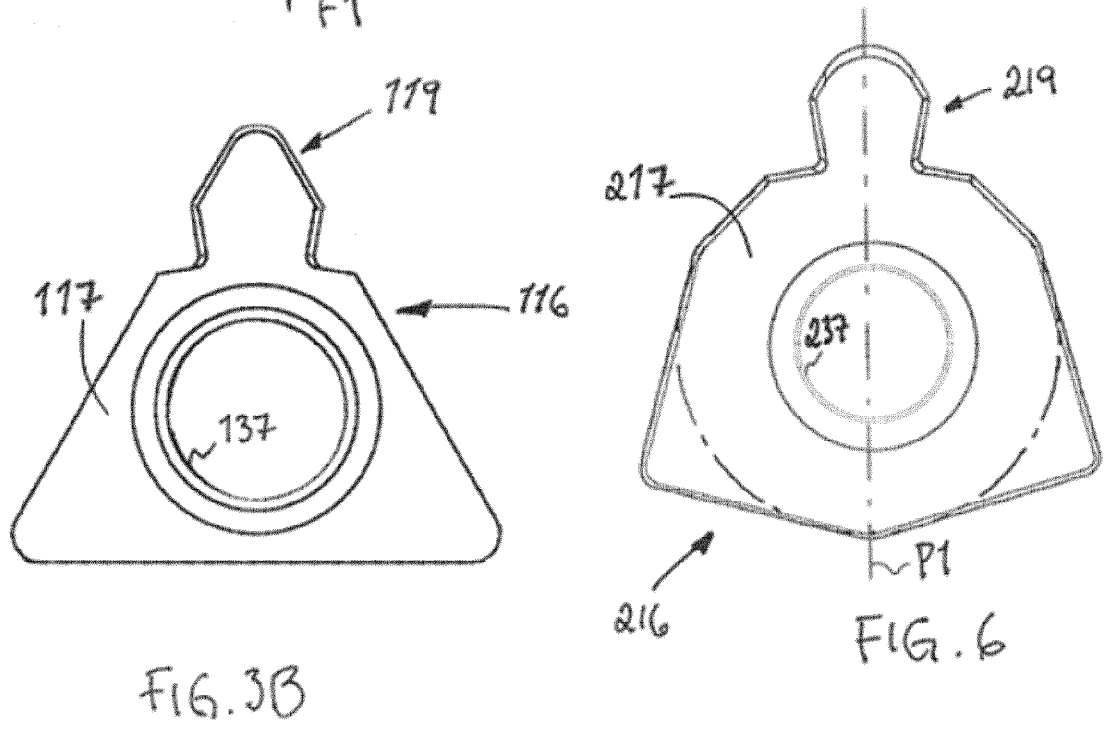

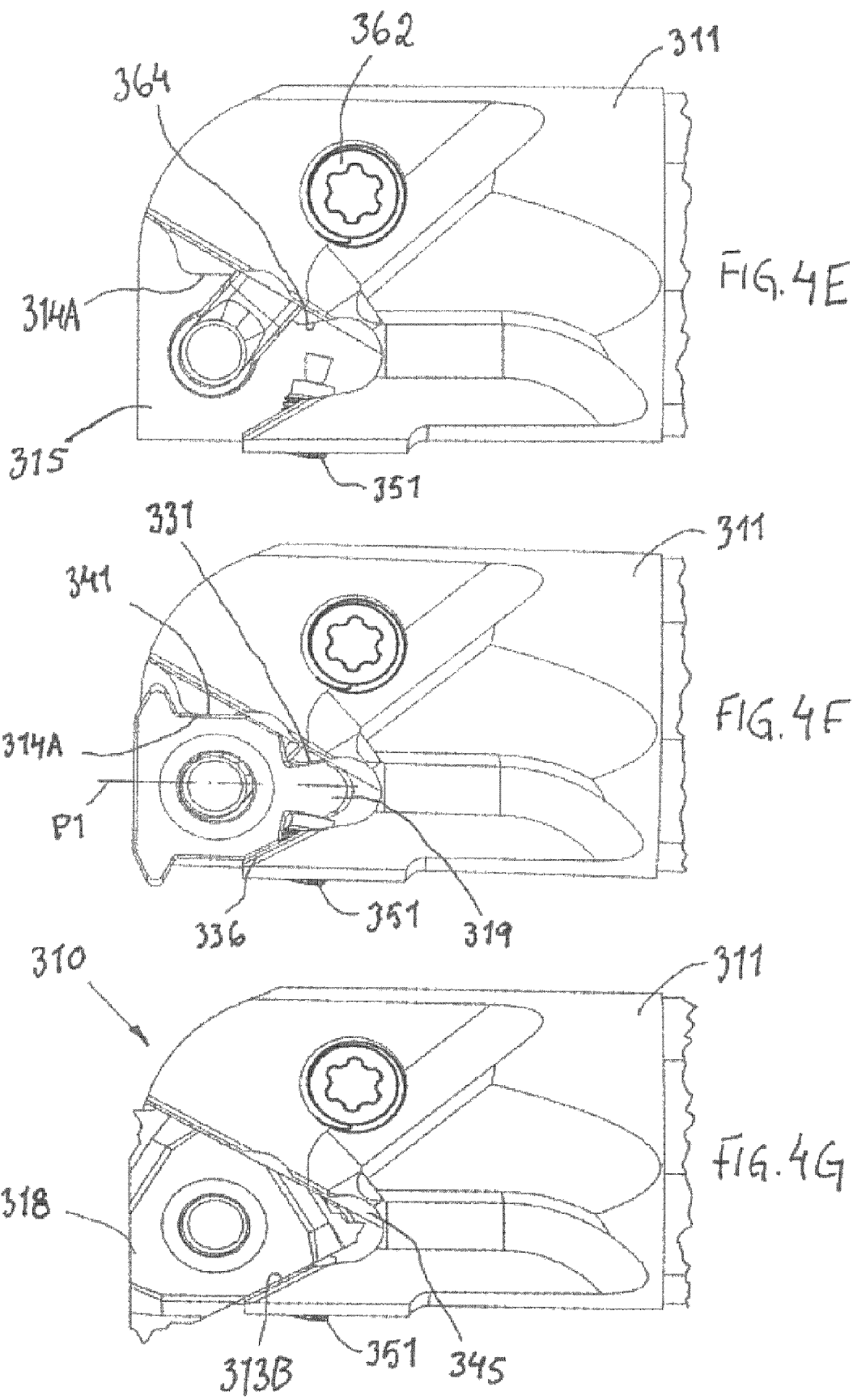

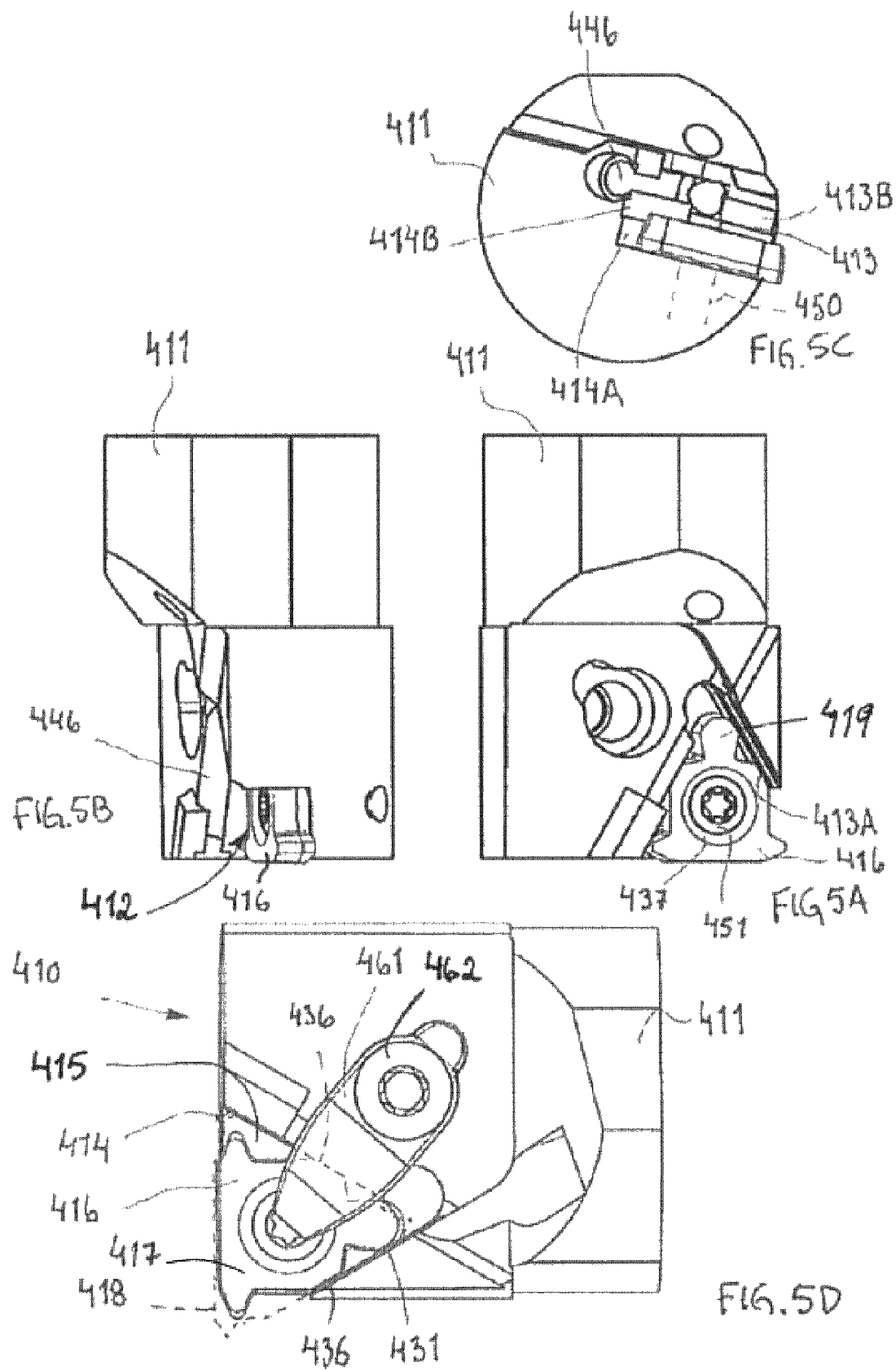

CUTTING TOOL AND ANVIL

RELATED APPLICATION DATA

This application is a § 371 National Stage Application of PCT International Application No. PCT/EP2017/059464 filed Apr. 21, 2017 claiming priority to EP 16170537.1 filed May 20, 2016.

FIELD OF THE INVENTION

The present invention relates to a cutting tool and an anvil for metal chip removing machining.

BACKGROUND AND SUMMARY

Usually when using a clamping lever for holding a cutting insert, an anvil or shim and a lever is held in place by means of an anvil sleeve, i.e. a semi-cylindrical member that is partially opened in a circumferential direction. The anvil sleeve is mounted in a center hole of the anvil and fastens in a receiving hole within the insert seat. An anvil sleeve can have a negative influence on the insert positioning accuracy, especially at threading, since anvils with different top and bottom angles are used depending on the thread's helix angle.

Anvils are most often clamped into the insert's seat by means of the described method when a clamping lever is used. In other cases the anvil is clamped by a screw trough a center hole reaching through the anvil or by a screw from the side. In the latter case the anvil is a part of the insert supporting/clamping system to support the axial cutting forces. U.S. Pat. No. 5,129,767 discloses an anvil having a projecting element.

It is desirable to provide a versatile and/or durable anvil that can be used in cutting tools of various geometries.

It is further desirable to improve cutting tools.

SUMMARY OF THE INVENTION

According to an aspect of the present invention, a metal cutting tool comprises a tool holder, a seat in said tool holder defined by side walls and bottom surface, a replaceable element constituted by an insert seating anvil positioned in said seat and secured by a fastening means therein, wherein a cutting insert is supported on a base surface of the anvil, the anvil having a projecting element formed integrally with the anvil, wherein the projecting elements rigid. The projecting element has a dove tail shape in top view, where the projecting element base and lower surfaces form coplanar extensions of the base and lower surfaces of the rest of the anvil. To have insert clamping and an anvil in the seat without the disadvantage of having to use an anvil sleeve is favorable. By avoiding the anvil sleeve the center hole can be made smaller than normal when using lever clamping (so called P lever), and therefore the anvil also becomes compatible with other holders, the so called C-lock holders.

According to another aspect of the present invention, the projecting element is mirror symmetrical about a plane and comprises at least one reaction surface that forms an acute angle with said plane which makes the anvil versatile.

According to another aspect of the present invention, the projecting element is adapted to cooperate with a fastening means for safely securing the anvil.

According to another aspect of the present invention, the projecting element forms a part of the base surface thereby adding to the total area for insert support.

According to another aspect of the present invention, the base surface extends continuously to the projecting element and is defined by a plane P2, a thickness of the projecting element is constant or substantially constant for further adding to the total area for insert support and may be easier to grind.

According to another aspect of the present invention, the projecting element is clamped by a fastening means as one way of safely securing the anvil.

According to another aspect of the present invention, the fastening means comprises a U-shaped clamp housed in an enlargement and the clamp is adapted to elastically grip the projecting element for a quick way to mount the anvil.

According to another aspect of the present invention, the fastening means comprises a set screw housed in a threaded boring and wherein the screw is adapted to press on one side of the projecting element for an alternative way to safely securing the anvil.

According to another aspect of the present invention, the projecting element comprises a free end and a waist or reduction, and wherein the seat has a pin which is provided in a bore in a side wall to abut against the cutting insert for facilitating safe mounting of the anvil and the cutting insert.

According to a further aspect of the present invention, an insert seating anvil for use with the metal cutting tool wherein the anvil has a projecting element formed integrally with the anvil, and wherein the projecting element is rigid for avoiding the use of an anvil sleeve.

According to another aspect of the present invention, a base surface is defined by a plane and a thickness of the projecting element is constant or substantially constant and the anvil has a through-going hole. By designing a hole in the anvil similar to a center screw lock style, the same anvil design can be used both for P-lever clamping as well as with a D-clamp and a center screw.

According to another aspect of the present invention, the projecting element has a waist or reduction that is wedge-shaped in two directions, i.e. in a longitudinal direction coinciding with a plane and in a direction transversal thereto for facilitating safe mounting of the anvil.

BRIEF DESCRIPTION OF THE DRAWINGS

The features and advantages of the present invention are well understood by reading the following detailed description in conjunction with the drawings in which like numerals indicate similar elements (often distinguished by n times hundred where n is an integer) and in which:

FIG. 1A is a top plan view of an anvil according to an aspect of the present invention;

FIG. 1B is a cross-sectional view of the anvil along line B-B in FIG. 1A;

FIG. 1C is a cross-sectional view of the anvil along line C-C in FIG. 1A;

FIG. 1D is a cross-sectional view of the anvil along line D-D in FIG. 1A;

FIG. 2A is an exploded perspective frontal view of a tool according to an aspect of the present invention;

FIG. 2B is another exploded perspective frontal view of the tool holder;

FIGS. 3A and 3B show plan views of a front portion of a tool holder and an anvil, respectively, according to another aspect of the present invention;

FIGS. 4E and 4F show plan views of a front portion of the tool holder;

FIG. 4G shows a plan view of a front portion of the tool;

FIGS. 5A-5C show parts of a tool holder according to still another aspect of the present invention in plan view, side view and front view, respectively;

FIG. 5D shows a forward portion of a threading tool in plan view; and

FIG. 6 shows a plan view of an anvil according to yet another aspect of the present invention.

Figure 1E:
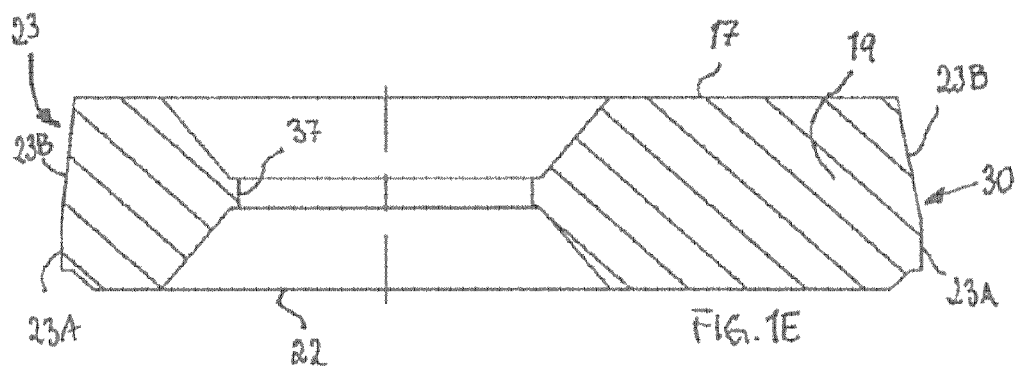
FIG. 1E is a cross-sectional view of the anvil along line E-E, i.e. plane P1, in FIG. 1A.
Figure 1F:
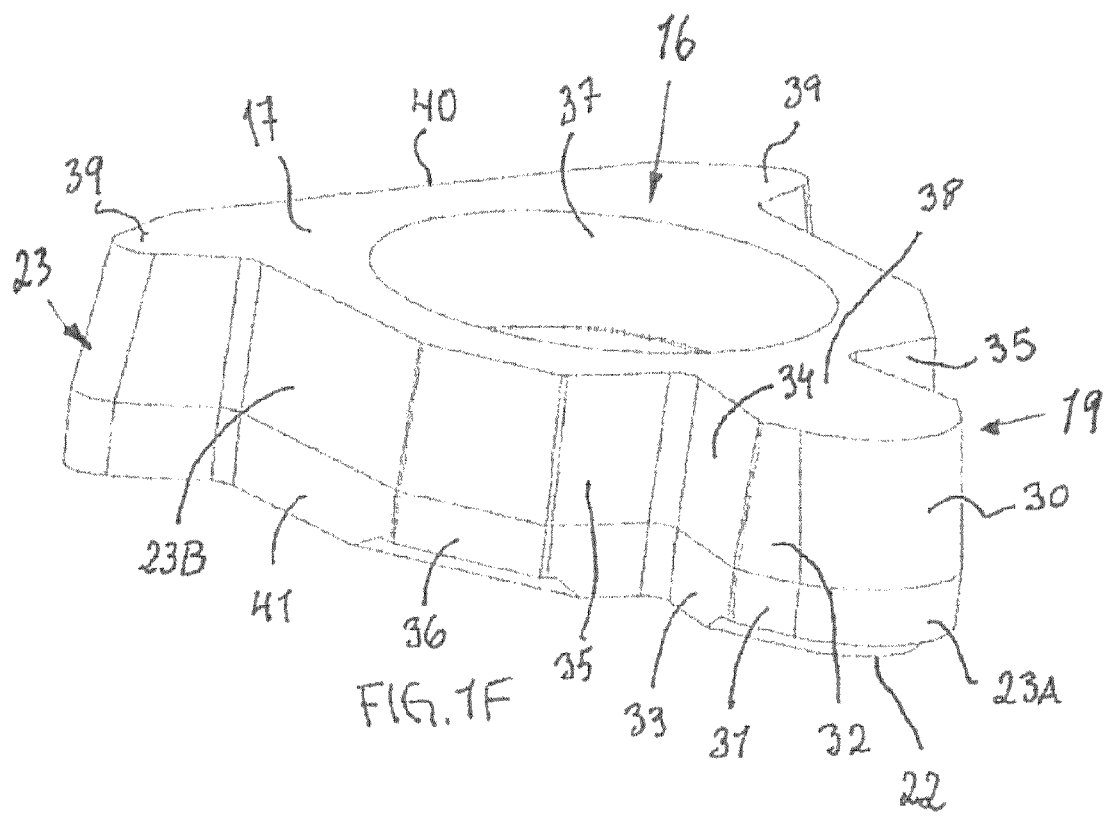
FIG. 1F is a perspective rear view of the anvil in FIG. 1A.

Each figure in the drawings is drawn to scale. However, sizes of the tool holder or its elements maybe reduced or enlarged by a certain amount.

DETAILED DESCRIPTION

Reference is now made to FIGS. 1A-1E showing an insert seating anvil 16 suitable for use in a pocket or seat 12 of a cutting tool holder 11 (FIG. 2A). The insert seating shim or anvil 16 is formed of a material which is harder and more wear resistant as compared to the material of the tool holder body, which is usually made of tool steel. For example, the anvil is typically made from cemented carbide, cermet and/or ultra-hard materials.

The anvil 16 has the shape of a plate comprising an upper surface or base surface 17, a lower surface 22, and side faces 23 extending between the surfaces 17 and 22. The base surface area may be smaller than the lower surface area. The base and lower surfaces can be parallel, but may form an angle of ±4 degrees, such that the anvil thickness is greater or smaller at extreme points relative to an average anvil thickness. The side face 23 may extend all around the anvil periphery. The side face 23 may, at least at a portion of said periphery, be comprised of several part surfaces, such as at least one lower part surface 23A and at least one upper part surface 23B. The lower part surface 23A may extend perpendicularly or substantially perpendicularly to the lower surface 22 or the base surface 17. The lower part surface 23A and the upper part surface 23B may form an internal obtuse angle $\beta$ with each other in a cross-section such as shown in FIG. 1B. The internal obtuse angle $\beta$ may be chosen within the range of 130-175°.

The anvil has a projecting element 19 formed integrally therewith. The projecting element may form a continuous part of the base surface 17 and/or the lower surface 22. The base surface 17 is defined by a plane P2. If the base surface would be profiled, such as a surface provided with grooves or bumps, the plane may be defined by at least three peaks of the base surface. A thickness T of the projecting element may be constant or substantially constant, e.g. the thickness will be defined by the angle between the base surface 17 and the lower surface 22.

The projecting element 19 is rigid in the meaning of stiff or unyielding or not pliant or not flexible or hard or firmly fixed or set, as opposite to springily compressible or resilient. The projecting element 19 may be made from the same material as the anvil itself, such as sintered cemented carbide or similar material. Thus the projecting element may have the same values for its shear modulus, bulk modulus, and/or Young's modulus as the rest of the anvil.

Figure 2C:
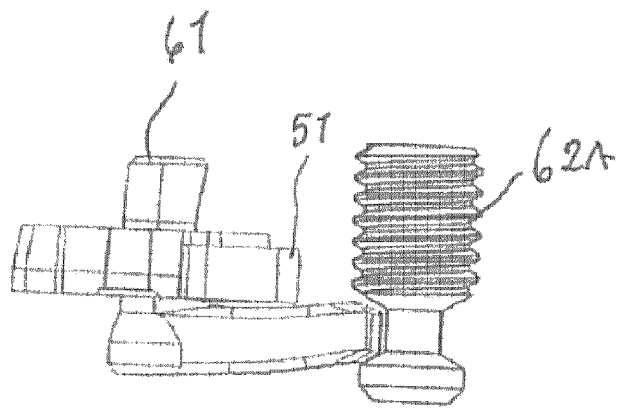
FIGS. 2C-2F show elements of the tool holder in side view, plan view, front view, and perspective view, respectively.
Figure 2D:
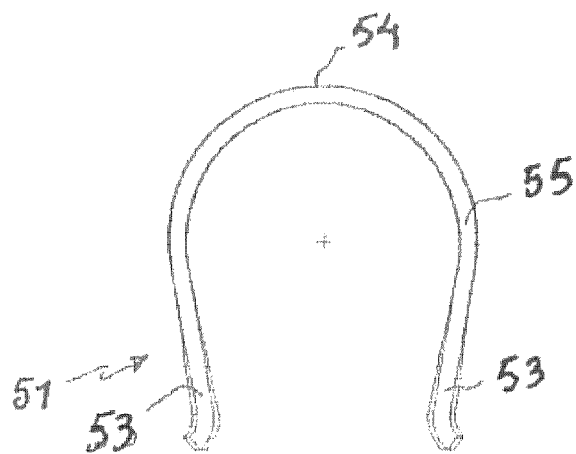
Figure 2E:
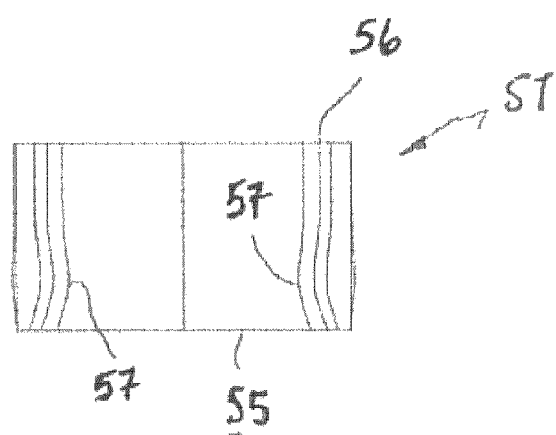
Figure 2F:
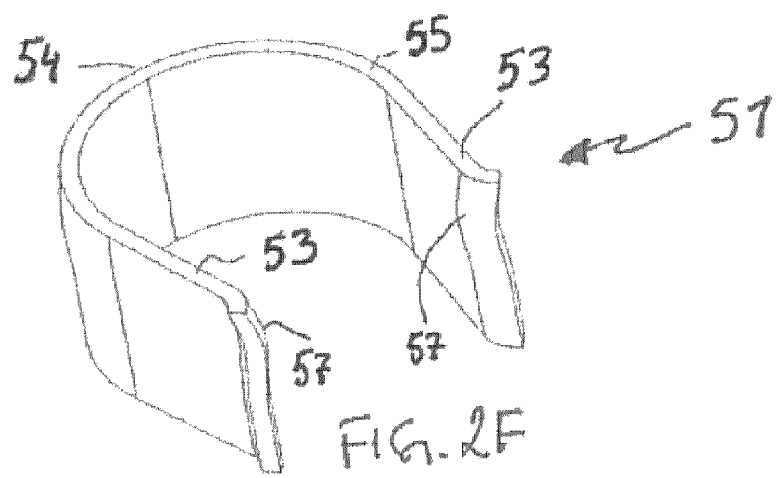

The projecting element 19 may have a dove tail shape in top view (see e.g. FIG. 1A), where the projecting element base and lower surfaces 17, 22 may form coplanar extensions of the base and lower surfaces of the rest of the anvil (see e.g. FIG. 1E).

The side face 23 may comprise the lower part surface 23A and the upper part surface 23B all around the anvil periphery which is beneficial for releasing the anvil blank from a die in case of pressing tungsten carbide with a binder phase therein. The lower surface 22 may be provided with conventional recesses for facilitating such release and for allowing the use of relatively large radii in the seat without them interfering with the positioning of the anvil.

The projecting element 19 may be mirror symmetrical about an imaginary plane P1 that divides the anvil 16 in two mirror symmetrical halves (FIG. 1A).

The upper part surface 23B at the projecting element has at least one reaction surface for clamping that forms an acute angle $\alpha$ with the plane P1. The acute angle $\alpha$ may be chosen within the range of 10-50°.

The projecting element 19 is adapted to cooperate with a fastening means to be held to the seat 12 in the tool holder 11. The projecting element can be clamped by the fastening means at a reaction surface on one or both sides of the plane P1.

The projecting element comprises a free end 30, the periphery of which is convexly curved in top view as shown in FIG. 1A. The curved periphery connects to first planar or straight portions 31 and 32 of the lower part surface 23A and the upper part surface 23B, respectively, at each side of the plane P1. Alternatively, the curved part may have another general shape, such as pointed, straight or concavely curved.

The first straight portion 31 at one side of the plane P1 may form an acute internal angle of 40 to 80° with the first straight portion 31 at the other side of the plane P1 when seen in a top view as in FIG. 1A. The first straight portions 31 converge towards the plane P1 rearwards of the free end 30, i.e. to the right in FIG. 1A. The first straight portion 32 at one side of the plane P1 may form an acute internal angle of 40 to 80° with the first straight portion 32 at the other side of the plane P1 when seen in a top view as in FIG. 1A. The first straight portions 32 converge towards the plane P1 rearwards of the free end 30. The first straight portion 31 may function as an abutment surface.

The first straight portions 31 and 32 in turn may connect to second portions 33 and 34, respectively, at each side of the plane P1. The second portions 33 and 34 may be curved although the preferred geometry shown is straight.

The second portion 33 at one side of the plane P1 may form an acute internal angle of 10 to 40° with the second portion 33 at the other side of the plane P1 when seen in a top view as in FIG. 1A. The second portions 33 converge towards the plane P1 forwards of the free end 30 and may intersect within or outside the base surface 17. The second portion 34 at one side of the plane P1 may form an acute internal angle of 10 to 40° with the second portion 34 at the other side of the plane P1 when seen in a top view as in FIG. 1A. The second portions 34 converge towards the plane P1 forwards of the free end 30, i.e. to the left in FIG. 1A, and may intersect within or outside the base surface 17.

The base surface may extend continuously to the free end 30 of the projecting element and both may coincide with the plane P2.

The second portions 33 and 34 are provided on both sides of the plane P1 and form a waist or reduction 38 that is wedge-shaped in two directions; e.g. in a longitudinal direction coinciding with the plane P1 in FIG. 1A, and in a direction transversal thereto as seen in FIG. 1B. The wedge-shape thus diverges towards the free end 30 and tapers toward the base surface 17.

The second portions 33 and 34 connect preferably via radii to a shoulder 35 on both sides of the plane P1, thereby forming the projecting element 19. The shoulder 35 in turn connects to a third portion 36 of the lower surface 23A. The third portion 36 may form an acute angle with the plane P1, may be perpendicular to the plane P2 and may function as an abutment surface. The third portion 36 in turn connects to a fourth portion 41 of the lower surface 23A. The fourth portions 41 may be parallel to the plane P1, may be perpendicular to the plane P2 and function as an abutment surface.

The anvil may comprise a through hole 37 for a clamping device such as a screw or a lever, i.e. the hole 37 intersects the base 17 and lower 22 surfaces. The anvil in FIGS. 1A to 1F is supposed to support a threading insert and may have one or two supporting projections 39 remotely located from the projecting element, and adjacent the fourth portions 41. The two projections 39 make the anvil usable for both right hand and left hand applications. An end surface 40 extends between the projections.

The waist 38 thus has angled surfaces that can be used for clamping the anvil in an insert seat such as with an elastic metallic clamp, or with a screw from a side.

Reference is now made to FIGS. 2A-2G showing a cutting tool, a tool holder and parts thereof in accordance with one aspect of the invention. The cutting tool 10 may be a turning tool for internal metal threading and comprises a holder body 11 having a seat 12. The seat 12 in the tool holder is defined by upstanding side walls 13, 14 and a bottom surface 15. The side walls 13, 14 form between them an angle that may be acute.

Figure 2G:
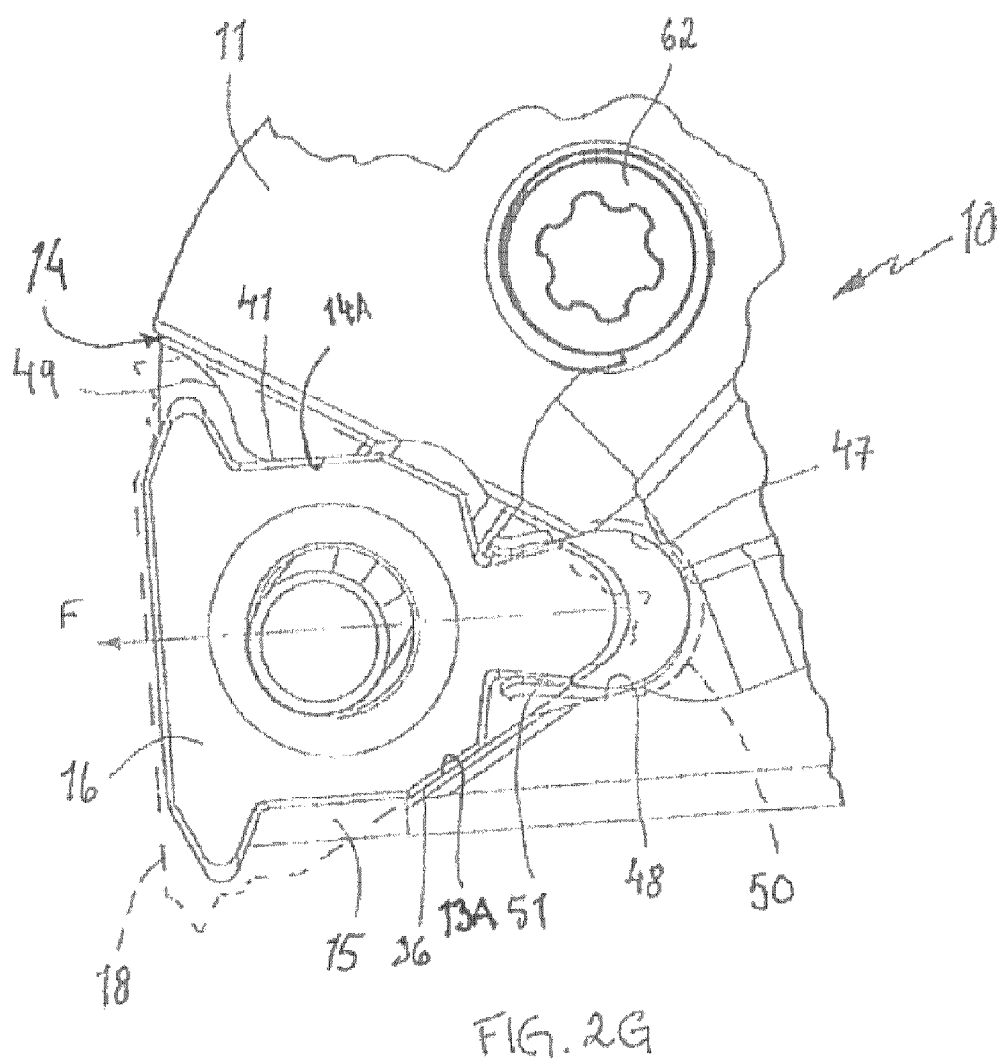
FIG. 2G shows a plan view of a front portion of the tool holder.
Figure 4A:
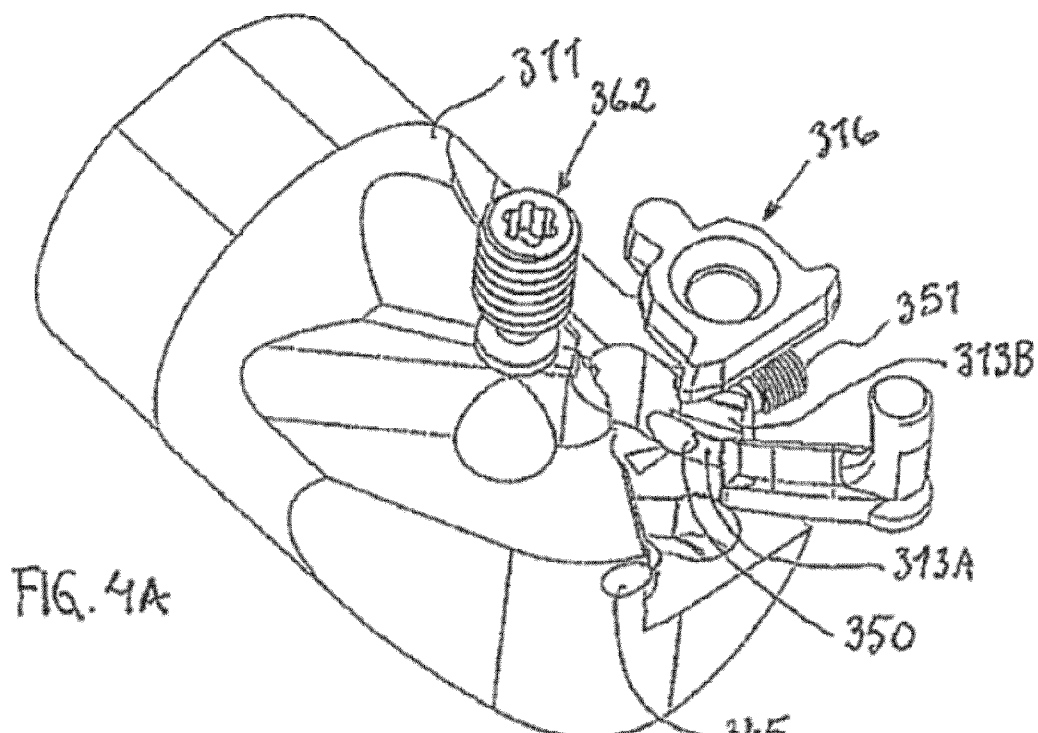
FIGS. 4A and 4B show exploded perspective frontal views of a tool according to still another aspect of the present invention.
Figure 4B:
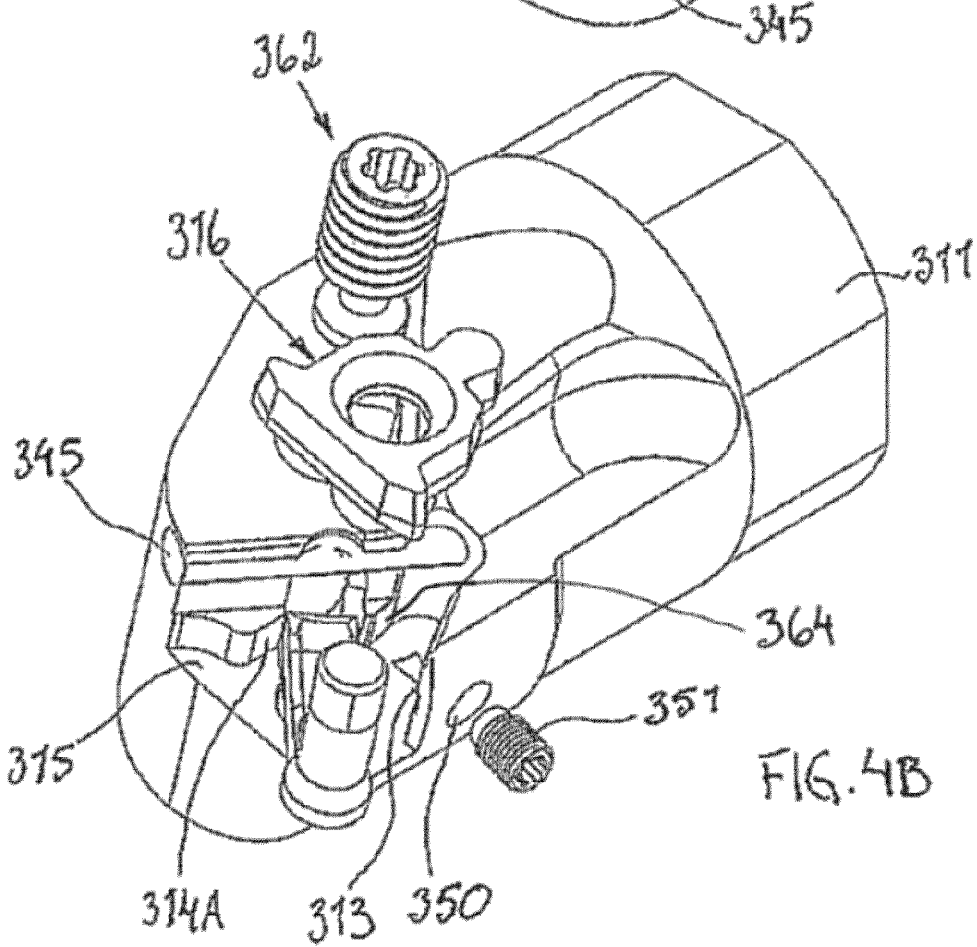
Figures 4C, 4D:
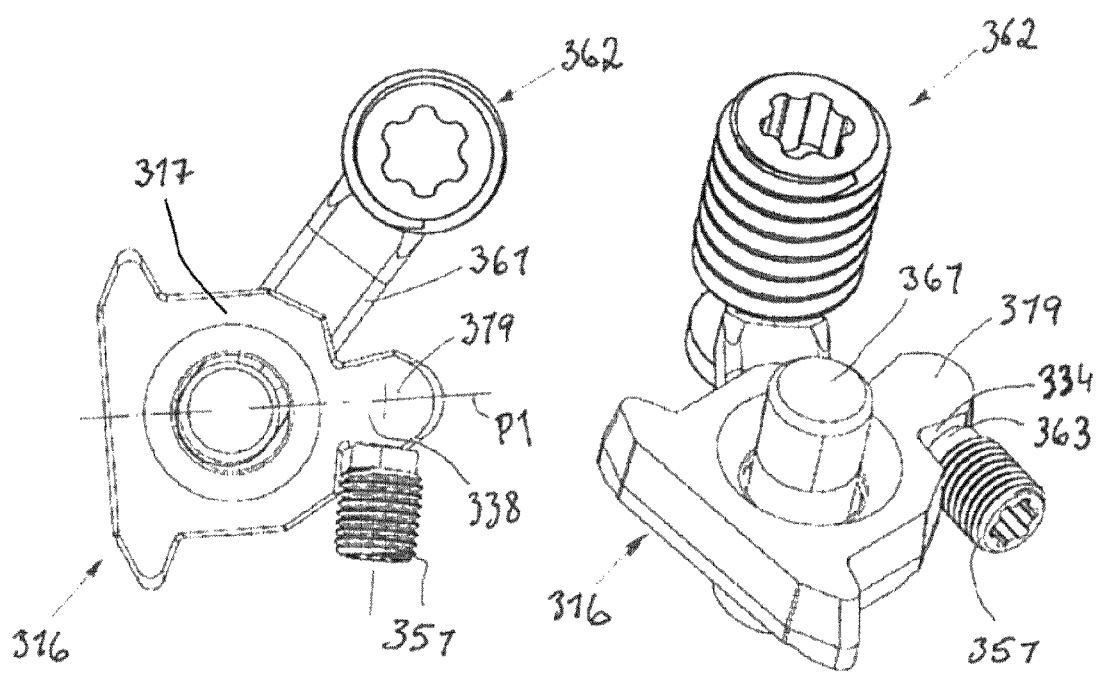
FIGS. 4C and 4D show elements of the tool holder in plan view, and front perspective view, respectively.

In this embodiment a first side wall 13 comprises coplanar lower 13A and upper 13B portions spaced by a groove or recess. The lower portion 13A is supposed to engage with the third portion 36 of the lower surface 23A of the anvil. The upper portion 13B is supposed to engage with a side surface or clearance surface of the cutting insert 18 (FIG. 2G).

The second side wall 14 comprises a lower portion 14A and an upper portion 14B. The lower portion 14A stands up from the bottom surface 15 and is supposed to engage with a fourth portion 41 of the lower surface 23A of the anvil and may extend parallel to a feed direction F or central axis of the cutting tool. The lower portion 14A may connect forwardly to a cut-out 49 to make space for a supporting projection 39. The upper portion 14B is supposed to engage with a side surface or clearance surface of the cutting insert 18.

The upper portion 14B may at least partially be convex such as by means of a pin 45, which is provided in or inserted into a bore or cavity 46 that communicates with the upper portion 14B or is open lengthwise towards the cutting insert. The pin has a convexly curved outer peripheral surface formed by any of a large number of shapes, e.g., cylindrical. The pin 45 is made of a material, such as hardened steel or cemented carbide, having higher hardness than the material of the tool holder body 11.

The cavity 46 is a boring, which extends parallel or substantially parallel to the bottom surface 15. The cavity 46 breaks through or intersects the upper portion, and a small portion of the outer periphery of the pin 45 projects through the cavity 46 and thus extends past the upper portion 14B and into the seat in a direction towards the cutting insert. The pin projects a distance, which is at most 40% of a diameter of the pin.

The pin 45 is adapted to present a line of contact in relation to the cutting insert 18 that is parallel or substantially parallel to the bottom surface. The line of contact is spaced from the bottom surface or an anvil corresponding to about a half of the thickness of a suitable cutting insert. The pin may be inserted into the cavity 46 with press fit and/or by deforming material of the holder around the pin.

The side walls 13, 14 converge towards a posterior end of the seat in relation to a feed direction F of the cutting tool (FIG. 2G). At the imaginary intersection of the side walls 13 and 14 is formed a tubular recess 47 which opens into the seat via a relatively narrow slot 48. The recess 47 has an enlargement 50 that connects to the bottom surface 15. The enlargement 50 has a generally greater dimension than the recess 47 for housing a clamp 51. The enlargement 50 forms an overhang or roof 52 with the recess 47. The pin 45 is not shown in FIG. 2G for clearness of the illustration.

The clamp 51 is for gripping and holding the anvil to the tool holder. The clamp 51 is generally U-shaped and comprises two resilient arms 53 connecting at a posterior end 54. The clamp 51 is urged into the enlargement 50 and held there by elastic deformation. The roof 52 and/or the bottom surface 15 secure the clamp in a height direction. As the resilient arms 53 proceed forward from the posterior end 54, the resilient arms 53 initially move away from each other before bending back towards one another. The forward portion of each resilient arm 53 is shaped to permit the introduction of the projecting element 19 between the resilient arms 53. Preferably, this is accomplished by having free ends on the forward portions of the resilient arms 53 a sufficient distance apart that the projecting element can have an initial portion 30 of the projecting element placed between the resilient arms 53 and then be pushed toward the posterior end 54 and thereby force the resilient arms 53 sufficiently far from one another to permit complete introduction of the projecting element that can fit completely between the resilient arms 53 or complete introduction of the portion of the projecting element having the maximum intermediate dimension. As soon as the entire projecting element or the portion of the projecting element having the maximum cross-sectional dimension has gone past the forward portions of the resilient arms 53 the resilient arms 53 will begin moving toward one another again. The clamp has an upper surface 55 and a lower surface 56. The internal surface of each arm 53 comprises a bulge 57 adjacent to the upper surface 55 such to form the shortest distance between the two arms.

With any embodiment of the clamp 51 it may be preferable to have the free ends of the resilient arms 53 rounded in order to preclude scratching operators and to facilitate insertion of the projecting element.

The bottom surface 15 may have a recess 60 to accommodate a conventional locking member 61. The recess 60 is key lock shaped in top view, e.g. a combination of a circle and a rectangle, and may have a ledge below about a center of the bottom surface 15. The indexable cutting insert 18 is clamped in the seat by means of an L-shaped locking member 61 projecting into a hole of the cutting insert. The L-shaped locking member urges the converging sides of the cutting insert against the upstanding walls 13 and 14, i.e. the upper portion 13B and the pin 45. The locking member forms a first leg of an L-shape pivotally arranged in the recess 60, a second leg of which member extends through a hole of the cutting insert. Actuating means 62 is provided to move the first leg downwardly and by this cause a pivoting action of the locking member around an axis and about a fulcrum point. The axis forms substantially a right angle with the direction in which the first leg extends. In the illustrated embodiment, the means 62 is in the form of a screw 62A threadably engaged in a hole 62B in the holder. The screw may have a single threaded end portion and may have an end portion arranged to engage a free end of the first leg of the L-shaped locking member, when the screw is turned, to cause said pivoting action of the locking member around the fulcrum point formed in the holder. The second leg passes through the recess 60 in the holder, the opening being shaped and dimensioned so as not to impede desired pivotal movement of the legs. The second leg is arranged to extend through the hole 37 of the anvil and into a central hole in the cutting insert and serves to detachably secure the cutting insert in the seat 12. The pivotal movement of a leg causes the cutting insert 18 to move towards the walls 13 and 14 and be clamped thereto and simultaneously clamp the anvil 16.

The clamp 51 is mounted in the enlargement 50 and the screw 62 and the locking member 61 are mounted in the hole 62B and the recess 60, respectively. The second leg extends through the hole 37. The hole 37 is greater in diameter than a maximum dimension or diameter of the second leg to allow their relative movement. The anvil 16 is mounted by for example sliding its lower surface 22 along the bottom surface 15 towards the clamp such that the projecting element 19 spreads the arms 53 apart and enters into the clamp 51. When the projecting element or the portion of the projecting element having the maximum cross-sectional dimension is entirely within the resilient arms 53, the bulges 57 will abut the second portion 34 at each side of the plane P1. Since the projecting element is wedge shaped in two directions the resilient arms 53 will push the anvil towards the bottom surface 15 and frictionally retain the projecting element since the arms are urged toward one another. Stated another way, the fastening means comprises a U-shaped clamp housed in an enlargement and the clamp is adapted to elastically grip the projecting element.

The anvil 16 is preferably designed to transfer only tangential forces from the cutting insert to the seat of the tool holder.

Referring now to FIGS. 3A and 3B in which a front portion of a tool holder 111 of a cutting tool 110 and an insert seating anvil 116 according to another aspect of the present invention are shown. The exemplifying tool is a tool for longitudinal turning having a feed direction F1 extending perpendicularly or substantially perpendicularly to a central axis of the cutting tool and/or a face turning tool with a generally triangular cutting insert 118 (shown in phantom). The anvil 116 is suitable for use in a seat 112 of the cutting tool holder. The anvil 116 is formed of a material as discussed in connection with the anvil 16.

The anvil 116 has a generally triangular basic shape to support the generally triangular cutting insert 118 via base surface 117. The anvil has a projecting element 119 formed integrally therewith. The geometry and function of the projecting element have been thoroughly described above.

Also in this embodiment, a clamp 151 is provided for gripping and holding the anvil to the tool holder. The clamp 151 is as stated above U-shaped and comprises two resilient arms 153. The clamp 151 is urged into an enlargement 150 and held there by elastic deformation. The roof 152 secures the clamp in a height direction. The forward portion of each resilient arm 153 is shaped to permit the introduction of the projecting element 119 between the resilient arms. Preferably, this is accomplished by having free ends on the forward portions of the resilient arms 153 a sufficient distance apart that the projecting element can have an initial portion of the projecting element placed between the resilient arms 153 and then be pushed inwardly and thereby force the resilient arms 153 sufficiently far from one another to permit complete introduction of the projecting element that can fit completely between the resilient arms 153 or complete introduction of the portion of the projecting element having the maximum intermediate dimension. As soon as the entire projecting element or the portion of the projecting element having the maximum cross-sectional dimension has gone past the forward portions of the resilient arms 153 the resilient arms 153 will begin moving toward one another again.

As noted before, an L-shaped locking member is provided to urge converging sides of the cutting insert against upstanding walls, e.g. an upper portion 113B and a pin 145. Actuating means or fastening means 162 is provided to cause a pivoting action of the locking member around an axis and about a fulcrum point. The axis forms substantially a right angle with a direction in which a first leg extends. A second leg passes through a recess in the holder. The second leg is arranged to extend through the hole 137 of the anvil and into a central hole in the cutting insert and serves to detachably secure the cutting insert in the seat 112. The pivotal movement of a leg causes the cutting insert to move towards the walls and be clamped thereto and simultaneously clamp the anvil.

FIG. 6 discloses an alternate anvil 216 having a base surface 217 suitable for a trigon-shaped cutting insert. The anvil is provided with a projecting element 219 and a through hole 237. The projecting element 219 is configured as defined above, while the rest of the anvil has a trigon shape. The projecting element 219 may be mirror symmetrical about an imaginary plane P1 that divides the anvil 216 in two mirror symmetrical halves.

Referring now to FIGS. 4A to 4G in which a front portion of a tool holder 311 of a cutting tool 310 and an insert seating anvil 316 (identical to anvil 16) according to another aspect of the present invention are shown. The exemplifying tool is a tool for threading substantially as shown and described in connection with FIGS. 1A to 2G. This embodiment differs from the previously described tool 10 in how the anvil 316 is initially clamped by a fastening means in the form of a set screw 351 treaded through a threaded boring 350. The threaded boring 350 slopes downwardly and inwardly from a jacket surface of the tool holder 311 through the upstanding side wall 313 at an axial position corresponding to the waist 338 (FIG. 4C) of the anvil when mounted in the seat 312. A center axis of the boring extends perpendicularly or substantially perpendicularly to a second portion 334 of the projecting element at the proximal side of the plane P1. A free end 363 of the screw 351 is adapted to abut the second portion 334 to simultaneously push the anvil downwardly and inwardly with reference to for example FIG. 4F.

A wedge-shaped second lower portion or reaction surface 364 stands up from the bottom surface 315 and is supposed to engage with a first straight portion 331 of the lower surface 323A at a distal side of the plane P1. The second lower portion 364 may extend parallel to the first straight portion 331, e.g. may form an acute internal angle of 10 to 40° with the plane P1 when seen in a top view as in FIG. 4F.

The set screw 351 is mounted in the boring 350 and the screw 362 and the locking member 361 are mounted as previously disclosed. The anvil 316 is mounted by for example sliding its lower surface along the bottom surface 315 axially rearwardly such that the projecting element 319 is fitted between second lower portion 364 and the set screw. When the set screw is tightened it will move the anvil inwardly and downwardly until the lower portion 313A engages with the third portion 336 of the lower surface of the anvil. The anvil surfaces 331, 334 and 341 may at that instance engage with the seat features 364, 363 and 314A, respectively.

The set screw 351, the boring 350 and the second lower portion 364 together form a clamp.

Thereby the anvil is secured in the seat by locking the anvil by a set screw from the side towards a reaction surface upstanding from the bottom surface to push the anvil into the seat as well as securing it downwardly.

The upper portion 313B and the pin 345 are supposed to engage with side or clearance surfaces of the cutting insert 318 when the cutting insert is clamped by the lever 361.

FIGS. 5A-5C show parts of a tool holder 411 according to still another aspect of the present invention, while FIG. 5D shows a forward portion of a cutting tool 410 comprising a tool holder 411. The tool holder 411 has a seat 412. The seat is defined by upstanding side walls 413, 414 and a bottom surface 415. The side walls 413, 414 form between them an angle that may be acute.

In this embodiment a first side wall 413 comprises coplanar lower 413A and upper 413B portions spaced by a groove or recess. The lower portion 413A is supposed to engage with a proximal third portion 436 of the lower surface of the anvil. The upper portion 413B is supposed to engage with a side surface or clearance surface of the cutting insert 418.

The second side wall 414 comprises a lower portion 414A and an upper portion 414B. The lower portion 414A may extend parallel to the upper portion 414B but is situated closer to the plane P1 than is the upper portion 414B. The lower portion 414A is supposed to engage with a distal third portion 436 of the lower surface of the anvil. The upper portion 414B is supposed to engage with a side surface or clearance surface of the cutting insert 418.

The upper portion 413B may at least partially be convex such as by a pin (not shown here), which is provided in or inserted into a bore or cavity 446 that communicates with the upper portion 414B or is open lengthwise towards the cutting insert.

An anvil screw 451 is mounted through an anvil hole 437 and into a threaded boring 450. The anvil screw is pretensioned in a conventional manner by adjusting a slight offset between the center of the boring and the side walls. The anvil 416 rests on the bottom surface 415 and the projecting element 419 is only used for support of the insert. When the anvil screw is tightened it will move the anvil inwardly, due to the offset, and downwardly until the lower portion 413A engages with the third portion 436 and a first straight portion 431 of the lower surface of the anvil and the lower portion 414A engages with a proximal third portion 436 of the lower surface.

Thereby the anvil is secured in the seat by locking the anvil with an anvil screw extending through the anvil hole.

The upper portion 413B and the pin are supposed to engage with side or clearance surfaces of the cutting insert 418 when the cutting insert is clamped by a so called D-clamp 461. The D-clamp is conventional and of an elongated shape. The clamp has a through hole and alignment means. The clamp is maneuvered by means of the screw 462 that screws into a threaded recess in the cutting insert holder 411. The clamp has a forward or proximal end intended to abut against the cutting insert 416 to urge the cutting insert against the anvil, the pin and the upper portion 413B.

The present invention thus relates to an anvil adaptable for all stationary tool holders using an anvil. The anvil has two cut-outs with angled surfaces that can be used for clamping the same, either with an elastic metallic clamp or a set screw from a side. This solution saves space underneath the insert seat, leading to that a more rigid lever can be used on small diameter cutting tools. The solution also provides back compatibility to use the same anvil in a conventional D-clamp tool holder locking the anvil with a center screw.

The anvil may have dedicated upper 17 and lower surfaces 22, which means that the two supporting projections underneath the insert make it possible to use the same anvil in both left and right hand tool holders.

The tool holders presented herein may be provided with coolant channels or ducts. Tool life generally increases with increase in coolant supply pressure. This can be attributed to the ability of the high-pressure coolant to lift the chip and gain access closer to the cutting interface. This action leads to a reduction of the seizure region, thus lowering the friction coefficient, which in turn results in reduction in cutting temperature and cutting forces. Preferably the pressure used in the discussed embodiments is above 40 bar, preferably above 100 bar coolant pressure.

In the present application, the use of terms such as "comprising" is open-ended and is intended to not preclude the presence of other structure, material, or acts. Similarly, though the use of terms such as "can" or "may" is intended to be open-ended and to reflect that structure, material, or acts are not necessary, the failure to use such terms is not intended to reflect that structure, material, or acts are essential. To the extent that structure, material, or acts are presently considered to be essential, they are identified as such. Terms such as "upper", "lower", "distal", "proximal", "top", "bottom", "forward" and "rear" refer to features as shown in the current drawings and as perceived by the skilled person.

While this invention has been illustrated and described in accordance with a preferred embodiment, it is recognized that variations and changes may be made therein without departing from the invention as set forth in the claims.

The disclosures in EP Patent Application No. 16170537.1, from which this application claims priority, are incorporated herein by reference.

The invention claimed is:

1. A metal cutting tool comprising:
   a tool holder;
   a seat in said tool holder defined by side walls and a bottom surface;
   a replaceable element formed by an insert seating anvil positioned in said seat and secured by a fastening device therein; and
   a cutting insert supported on a base surface of the insert seating anvil, the insert seating anvil having a projecting element formed integrally therewith, the projecting element being rigid and the insert seating anvil having a lower surface, wherein the projecting element has a dove tail shape and includes a free end and a waist or reduction, a base surface and a lower surface of the projecting element forming coplanar extensions of respective base and lower surfaces of the insert seating anvil, wherein the projecting element is mirror symmetrical about a plane that divides the insert seating anvil into imaginary symmetrical halves, the projecting element including at least one outer reaction surface that forms an acute angle with said plane.

2. The metal cutting tool according to claim 1, wherein the projecting element is arranged to cooperate with the fastening device.

3. The metal cutting tool according to claim 1, wherein the projecting element forms a part of the base surface.

4. The metal cutting tool according to claim 1, wherein the base surface of the insert seating anvil extends continuously to the projecting element and is defined by a plane and wherein a thickness of the projecting element is constant.

5. The metal cutting tool according to claim 1, wherein the projecting element is clamped by the fastening device.

6. The metal cutting tool according claim 5, wherein the fastening device is a U-shaped clamp housed in an enlargement of the seat, and wherein the clamp is arranged to elastically grip the projecting element.

7. The metal cutting tool according claim 5, wherein the fastening device is a set screw housed in a threaded boring of the seat, and wherein the screw is arranged to press on one side of the projecting element.

8. The metal cutting tool according to claim 1, wherein the seat has a pin which is provided in a bore in a side wall to abut against the cutting insert.

9. An insert seating anvil comprising:
 a base surface and a lower surface;
 a projecting element formed integrally with the anvil, the projecting element being rigid, wherein the projecting element has a dove tail shape and includes a free end and a waist or reduction, a base surface and a lower surface of the projecting element forming coplanar extensions of the base and lower surfaces of the anvil, wherein the projecting element is mirror symmetrical about a plane that divides the insert seating anvil into imaginary symmetrical halves, the projecting element including at least one outer reaction surface that forms an acute angle with said plane.

10. The insert seating anvil according to claim 9, wherein the projecting element is arranged to cooperate with a fastening device.

11. The insert seating anvil according to claim 9, wherein the projecting element forms a part of the base surface of the anvil.

12. The insert seating anvil according to claim 9, wherein the base surface of the anvil is defined by a plane, wherein a thickness of the projecting element is constant and wherein the anvil has a through-going hole.

13. The insert seating anvil according to claim 9, wherein the waist or reduction is wedge-shaped in a longitudinal direction coinciding with a plane and in a direction transversal thereto.

\* \* \* \* \*